United States Patent [19]

Adams et al.

[11] Patent Number: 5,678,719

[45] Date of Patent: *Oct. 21, 1997

[54] UNITARY TAMPER-EVIDENT FITMENT AND CLOSURE ASSEMBLY

[75] Inventors: Brian M. Adams, Newark; Daniel Luch, Morgan Hill; Rawson L. Chenault, San Francisco, all of Calif.

[73] Assignee: Portola Packaging, Inc., San Jose, Calif.

[*] Notice: The term of this patent shall not extend beyond the expiration date of Pat. No. 5,348,184.

[21] Appl. No.: 565,927

[22] Filed: Dec. 1, 1995

Related U.S. Application Data

[60] Division of Ser. No. 226,767, Apr. 12, 1994, Pat. No. 5,512,228, which is a continuation-in-part of Ser. No. 57,050, May 3, 1993, abandoned, which is a division of Ser. No. 13,258, Feb. 3, 1993, Pat. No. 5,249,695, which is a continuation of Ser. No. 664,658, Mar. 5, 1991, abandoned, said Ser. No. 226,767, is a continuation-in-part of Ser. No. 58,872, May 5, 1993, abandoned, which is a continuation of Ser. No. 823,708, Jan. 21, 1992, Pat. No. 5,271,519, which is a continuation-in-part of Ser. No. 664,658, Mar. 5, 1991, abandoned, said Ser. No. 226,767, is a continuation-in-part of Ser. No. 822,200, Jan. 17, 1992, Pat. No. 5,219,971, and a continuation-in-part of Ser. No. 961,088, Oct. 14, 1992, Pat. No. 5,348,184, which is a continuation-in-part of Ser. No. 823,200, Jan. 21, 1992, Pat. No. 5,303,837, and a continuation-in-part of Ser. No. 780,774, Oct. 22, 1991, Pat. No. 5,174,465, and a continuation-in-part of Ser. No. 664,658, Mar. 5, 1991, abandoned.

[51] Int. Cl.[6] ........................... B65D 41/32
[52] U.S. Cl. ............ 220/266; 220/270; 215/253; 222/562; 222/569; 222/545.1; 229/125.15

[58] Field of Search .................. 220/254, 256, 220/257, 258, 265, 266, 270, 276, 307, 359; 215/211, 213, 216, 232, 250, 253, 306; 229/125.15, 125.17; 222/545.1, 562, 569

[56] References Cited

FOREIGN PATENT DOCUMENTS

WO90/03919 4/1990 WIPO.

*Primary Examiner*—Allan N. Shoap
*Assistant Examiner*—Nathan Newhouse
*Attorney, Agent, or Firm*—Flehr Hohbach Test Albritton & Herbert LLP; Julian Caplan

[57] ABSTRACT

A tamper-evident thermoplastic fitment having a spout and a closure for said spout are welded to a polymer-coated paperboard container or to a flexible plastic container. The fitment and closure are initially molded simultaneously but with a substantial space between the two parts interconnected by an elongated runner which conducts molten plastic from the closure to the fitment. Upon retraction of the core of the mold, the closure is pulled into the spout until shoulders on the parts engage, whereupon the closure is stripped from the mold core. The runner comprises a tear tab which slides through an apertured space on the closure. When the parts engage tangs on the tear tab engage the space, making the assembly tamper-evident. The fitment has a flange which may be welded or otherwise secured to the container. The tab may be pulled by the consumer to open the container. The closure may be unscrewed from the spout or otherwise disengaged.

33 Claims, 9 Drawing Sheets

UNITARY TAMPER-EVIDENT FITMENT AND CLOSURE ASSEMBLY

CROSS REFERENCES TO RELATED APPLICATIONS

This is a division of application Ser. No. 08/226,767 filed Apr. 12, 1994, now U.S. Pat. No. 5,512,228.

This application is a continuation-in-part of U.S. Ser. No. 08/057,050, filed May 3, 1993, now abandoned, which is a division of U.S. Ser. No. 08/013,258, filed Feb. 3, 1993, now U.S. Pat. No. 5,249,695 which is a continuation of U.S. Ser. No. 07/664,658, filed Mar. 5, 1991, now abandoned.

This application is also a continuation-in-part of U.S. Ser. No. 08/058,872, filed May 5, 1993, now abandoned, which is a continuation of U.S. Ser. No. 07/823,708, filed Jan. 21, 1992, now U.S. Pat. No. 5,271,519 which is a continuation-in-part of U.S. Ser. No. 07/664,658, filed Mar. 5, 1991, now abandoned.

This application is also a continuation-in-part of U.S. Ser. No. 07/822,200 filed Jan. 17, 1992, now U.S. Pat. No. 5,219,971.

This application is also a continuation-in-part of U.S. Ser. No. 07/961,088, filed Oct. 14, 1992, now U.S. Pat. No. 5,348,184, which is a continuation-in-part of U.S. Ser. No. 07/823,200, filed Jan. 21, 1992, now U.S. Pat. No. 5,303,837, and of U.S. Ser. No. 07/780,774, filed Oct. 22, 1991, now U.S. Pat. No. 5,174,465 and U.S. Ser. No. 07/664,658, filed Mar. 5, 1991, now abandoned.

The disclosures of the above applications are hereby incorporated herein by reference.

BACKGROUND OF THE INVENTION

1. Field of the Invention

This invention relates to a new and improved spout fitment and a plug type cap for closing same. More particularly, the invention relates to a fitment which fits around a hole in a panel of a paperboard carton or around a hole in a flexible container such as used for packaging liquid products and powders and to a closure for such fitment. The invention is further characterized in that it is tamper evident. More particularly, the invention relates to a unitary fitment and closure molded in a single mold wherein the cap and the fitment are molded axially spaced apart. An elongated tear tab (which is one of the elements of the tamper-evident feature of the assembly) extends from the fitment up to the cap and functions during the molding process as a "runner." In other words, plastic material flows into the portion of the mold which forms the cap, thence down the tear tab runner and finally into the portion of the mold which forms the fitment. The cap may be assembled with the fitment as part of the molding process in that as the core of the mold retracts, the cap is drawn along with the core and assembles the two components together. The cap is then stripped from the core since the cap can move no further.

The invention is applicable to packaging having long shelf-life wherein a separate piece of foil or plastic material is welded to the underside of the flange of the fitment and, optionally, to the bottom edge of the cap.

2. Description of the Related Art

Generally speaking, prior fitments have spouts formed with external threads closed by caps with internal threads. Some fitments are used in conjunction with plastic bag containers, the fitment being integrally welded to the plastic bag. Other prior art fitments are attached to a polymer-coated paperboard container, such as a gable-top container which, optionally, may be lined with foil or plastic. Prior art fitments for paperboard cartons usually include a thin flange which is welded to the polymer-coated paperboard surface of the container.

It will be understood that instead of a screw thread engagement of the cap to the spout of the fitment, a snap-on, snap-off engagement may be used. Such an attachment has been previously used in the fitment art.

Fitments of the prior art have a number of deficiencies as compared to the present invention. In the first place, they employ multiple components which increase the cost of the combination very greatly over the simple structure of the present invention. Secondly, the assembly is difficult and often involves rotary equipment which is difficult to control in practice and is expensive to install. Thirdly, because of the fact that the prior an spouts are externally threaded, the diameter of the opening in the spout is restricted inasmuch as there is only limited space on the panel of the container on which the flange can be located, thereby reducing the diameter of the fitment flange and correspondingly the internal diameter of the spout. Fourthly, commercially available fitment closure combinations have no external tamper-evident features, demonstrated, for example, by the internal foil seal of the spout opening of some prior art fitments.

The openings in prior container panels have been closed by barrier layers, such as shown in U.S. Pat. No. 4,813,578. Such barrier layers are, however, usually part of the laminate of which the container panel is formed. Potions of the plug or cap are secured to the barrier so that when the plug is removed, the barrier is fractured, providing access to the interior of the container. The use of the laminate as the barrier involves manufacturing difficulties which do not occur in accordance with the present invention.

All of the foregoing deficiencies are eliminated in the present invention.

SUMMARY OF INVENTION

In accordance with the present invention, a fitment having a spout into which the skirt of the cap fits is provided. Either the spout and cap skirt are formed with mating threads or the telescoping surfaces are so formed that they are engaged when assembled.

A feature of the present invention is that the cap and fitment are molded together in a single mold, and the portion of the cavity which forms the cap is spaced from the portion which molds the fitment. The two portions are interconnected by a runner which ultimately comprises an elongated tear tab for the tamper-evident features of the assembly of cap and spout. The tab may be made long enough to be conveniently gripped by the consumer by reason of the fact that the two mold cavity portions are spaced apart.

Another feature of the present invention is the fact that the core which forms the interior of the cap, as it moves downward relative to the spout, pulls the cap with it and assembles the cap and spout together by the time the molding operation is completed. For such purposes, the interior of the cap may be formed with an internal ring which seats in a groove in the mold core and prevents dislodgment of the core from the cap until the completion of the assembly operation. Alternatively the cap may be formed with an internal groove and the mold core with a ring to effect the same operation.

Another feature of the present invention is the fact that the connection between the runner (tear tab) and the cap is frangible and ruptures through a sub-gating design. The subgate ruptures when the cavity is first removed. Thus as the core moves the cap toward the fitment, the tear tab slides relative to the cap. When the two components are assembled together, locking lugs on the tab slip through a hole in a flange extension of the cap to lock the system together in a tamper-evident manner. The fitment is then inserted through the hole in the container, and the flange of the fitment is welded to the container.

The consumer grips the tear tab (which may be elongated because of the manner in which the parts are molded) and breaks the connection of the tear tab with the fitment, thereby giving evidence of tampering.

In one form of the present invention, a foil disk of the same or greater diameter than the flange of the fitment is attached to the underside of the flange by welding, and the foil may also welded be to the bottom edge of the plug which fits into the spout of the fitment. The assembled fitment and plug are inserted through the opening in the container panel from the inside of the container and, if the foil is larger than the flange the foil may be welded to the underside of the container panel in liquid-tight fashion. Even if the foil is smaller than the flange, entry of air, odors, etc. into the container is inhibited, as hereinafter explained, increasing the shelf life of the product packaged in the container.

In one form of the invention, instead of threads on the fitment and cap skirt, mating seals are provided which inter-engage when the cap is seated in the fitment preventing leakage.

The spout is formed with a continuously smooth seal bead. The lower portion of the cap is likewise smooth. The seal bead engages the skirt in air-tight manner, even after initial opening of the container.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

Figure 1:
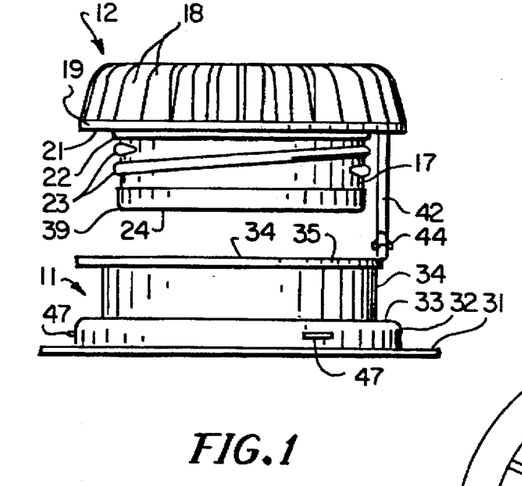
FIG. 1 is a side elevational view of the cap and fitment at the stage of the molding operation where molding is completed but prior to retraction of the mold core.

As shown in FIG. 1, as molded, fitment 11 and cap 12 are spaced apart, the portion of the mold cavity which molds the fitment being connected to the portion of the cavity which molds the cap by means of a runner which, as hereinafter explained, comprises the tear tab 42. As the core of the mold retracts, the cap is pulled down to the position shown in FIG. 4, the tear tab 42 sliding upwardly relative to the cap 12. Some of the details of the mold and molding process are hereinafter described.

In the form of the invention shown in FIGS. 1 to 4, cap 12 comprises a top 16 from the periphery of which depends skirt 17. The exterior of the upper portion of skirt 17 is formed with external vertical ribs 18 which assist the user in unscrewing the cap after assembly. An outward extending flange 19 is formed at the lower ends of the ribs 18 having a shoulder 21 on its underside. Immediately below shoulder 21 is a seat 22 which comprises an enlargement on the exterior of skirt 17. External threads 23 are formed on the portion of skirt 17 below the seat 22. Cap 12 terminates in a lower, bottom edge 24; and one of the features of the present invention is the fact that the external surface 39 of the skirt above bottom edge 24 is smooth so that it may seal against the fitment 11 in assembled position.

Figure 3:
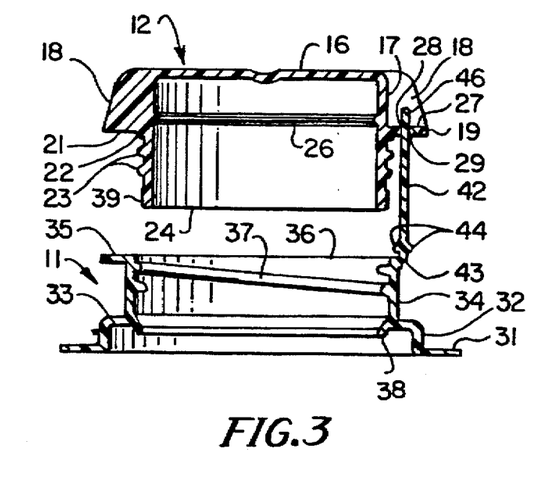
FIG. 3 is a sectional view taken substantially along the line 3—3 of FIG. 2.

Internal bead 26 may be formed on skirt 17 just above the level of flange 19. The bead 26 is formed by a groove in the core of the mold, as hereinafter explained. The function of the bead 26 is the insure that the cap 12 retracts with the core just prior to the completion of the molding operation.

Figure 2:
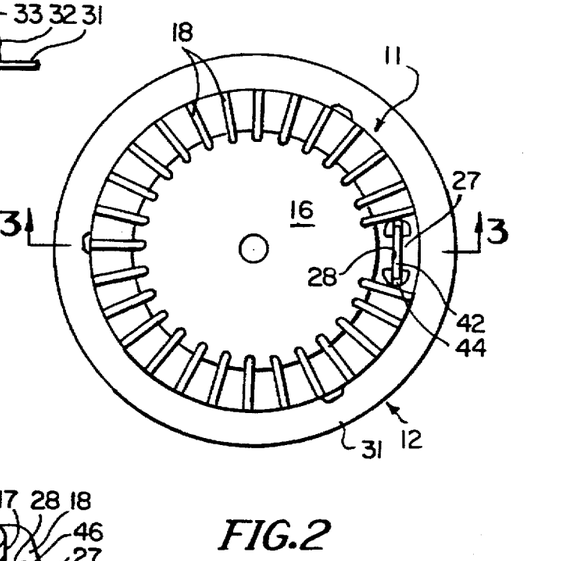
FIG. 2 is a top plan view of the structure of FIG. 1.

At one location there is a space 27 between ribs 18 which is a flat surface on the top of flange 19 formed with an aperture 28. The underside of space 27 is formed with a bevel 29 below aperture 28.

The fitment portion 11 comprises an annular flange 31 having an upward offset 32 at its inner edge merging into an annular rim 33 parallel to flange 31. Extending up from the inner edge of rim 33 is spout 34 which has an upper edge 36 with a peripheral flange 35 dimensioned to fit against the shoulder 21 in the assembled position shown in FIG. 4. The seat 22 of cap 12 fits immediately inside the upper edge of the spout 34. Internal threads 37 are formed on the interior of spout 34 shaped to mesh with the threads 23. The materials of which the fitment 11 and cap 12 are molded are sufficiently flexible so that when the cap 12 is pulled down relative to the fitment 11, the threads 23 and 37 slip past each other and then interengage.

A seal ring 38 slants downward-inward to engage the smooth surface 39 on the exterior of skirt 17 below threads 23. The primary seal of the fitment and cap is preferably the seal of surface 38 with smooth surface 39.

Figure 3A:
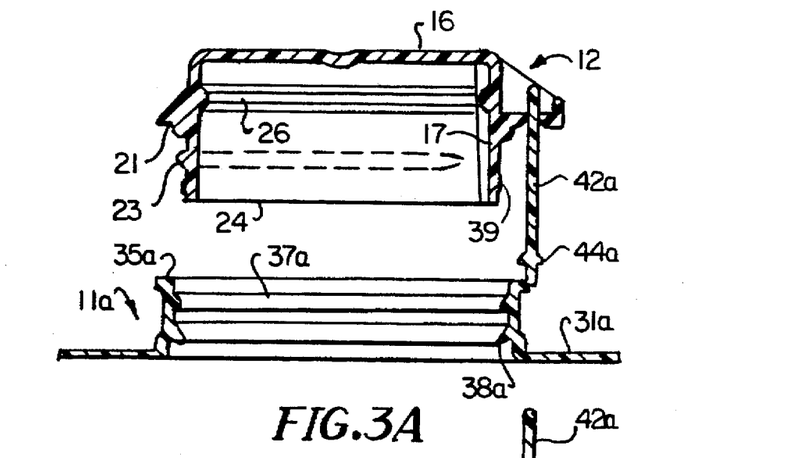
FIG. 3A is a view similar to FIG. 3 of a modification.
Figure 4:
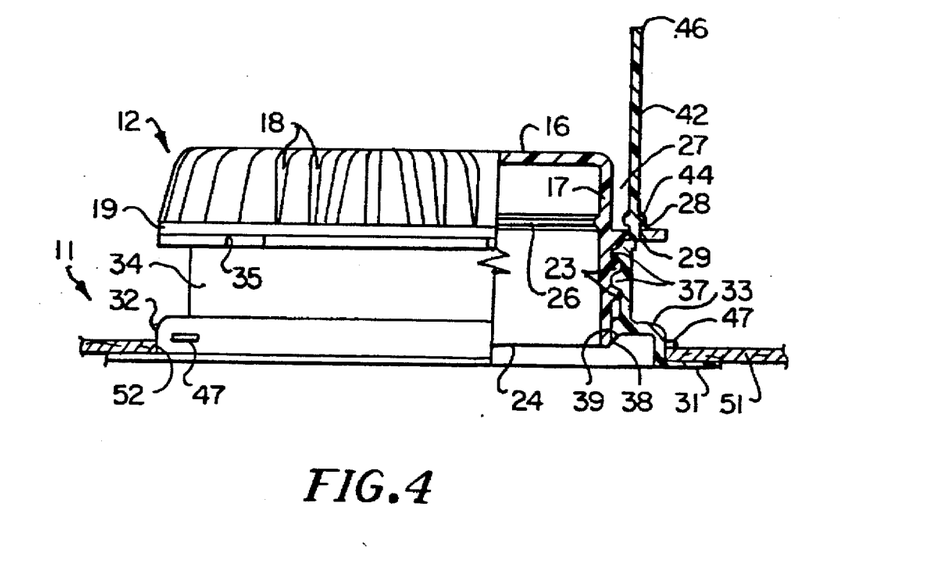
FIG. 4 is a side elevational view of the cap and spout of FIG. 3 assembled together and installed on a container, the view being partially broken away in section to reveal internal construction.
Figure 4A:
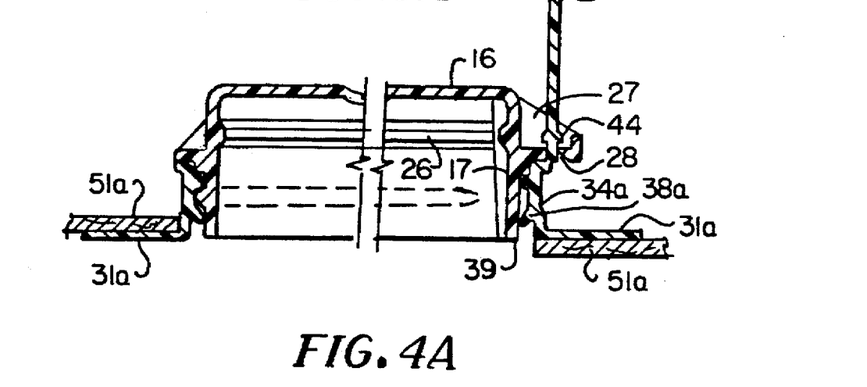
FIG. 4A is a view similar to FIG. 4 of the modification of FIG. 3A.

A modification of the structure of FIGS. 3 and 4 is shown in FIGS. 3A and 4A, respectively. The seal ring 38a is located spaced above the lower end of the spout 34a and this and the ring 38a engages the smooth exterior 39a of skirt 17 spaced upwardly from the bottom edge of said skirt. Both the ring 38a and the surface 39a are smooth and are characterized by the absence of parting lines. Hence, a leak-proof seal is readily achieved.

Returning now to FIGS. 1 and 3, projecting outward at the upper end of spout 34 immediately below edge 36 is a flange 35 and extending vertically upwardly in alignment with aperture 28 is tear tab 42 which, as heretofore explained, functions as a runner to deliver molten plastic from the cap to the fitment during the molding process. A notch 43 is made in the outer, lower corner of the juncture of flange 35 and tab 42 so that the tab 42 may be torn off. So long as the tab 42 is connected to fitment 11, however, the assembly shown in FIG. 4 is tamper evident.

Extending outwardly and inwardly of tab 42 above upper edge 36, at a distance slightly greater than the thickness of space 27, are tangs 44. When the two parts are drawn together as shown in FIG. 4, tangs 44 slip through the aperture 28 and lock above the space 27, preventing the parts from being disassembled so long as the tab 42 is attached to the fitment 11.

Directing attention to FIG. 4, the assembly of fitment 11 and cap 12 may be installed on a panel of container 51 having a hole 52 dimensioned therein which is approximately equal to the outside diameter of offset 32. Preferably the assembly of fitment and cap is inserted through hole 52 from below panel 51 as viewed in FIG. 4. Projections 47 on offset 32 may be used to engage the top surface of container 51 to hold fitment 11 in place. The flange 31 is welded, glued, mechanical or otherwise permanently secured to the surface of container panel 51.

To open the container, the user pulls the tab 42, fracturing the connection at the notch 43 and then unscrews cap 12.

As shown on the left hand side of FIG. 4A flange 31a extends straight out from spout 34a and there is no offset such as offset 32 shown in FIGS. 1–4. In FIG. 4A, right side, the paperboard carton 51a is welded to the flange 31a on the exterior of paperboard 51a. As shown in the left-hand side of FIG. 4A the paperboard 51a is welded to the exterior of flange 31a.

Figure 9:
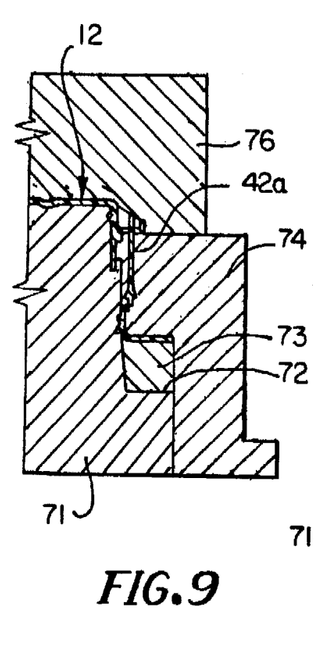
FIG. 9 is a schematic view showing completion of the molding of the intermediate product of FIG. 3A and a vertical sectional view through the mold for molding same.

FIGS. 9–15 illustrate the molding sequence for the fitment 11a and closure 12 illustrated in FIG. 3A. FIG. 9 shows the parts of the mold and the intermediate product consisting of fitment and cap at the conclusion of the molding operation. The mold parts are, of course, illustrated schematically and the means for actuating movement thereof are not shown but will be well understood by those skilled in the plastic molding art. Core 71, cavity 76 and slide 74 are machined to provide clearances (herein "voids") between abutting surfaces which are filled with plastic material to form the mold parts. By means not shown but well understood in the art, molten plastic is injected through the cavity 76 so that plastic fills the void between the cavity 76 and core 71 to form the cap and also causes plastic to extend down through tear tab 42a to form the fitment 30a as well.

Figure 10:
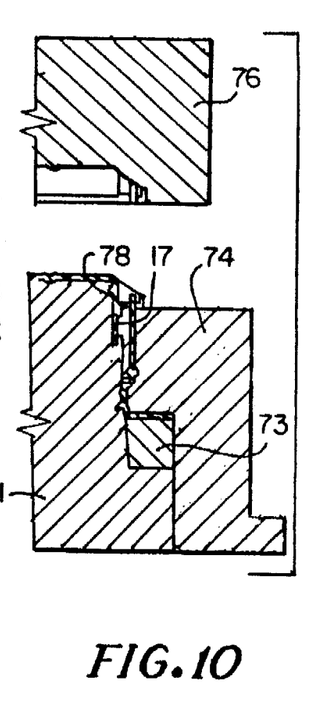
FIGS. 10–13 are sequential views of the mold of FIG. 9 until discharge of the assembled plug and fitment.

After the plastic has been injected and fills the mold void as shown in FIG. 9, core 71 and slides 74 retract to the position of FIG. 10. Slides 74 (only one of which is shown) are shown in FIG. 10 in closed position and of particular importance is the fact that a portion of each slide extends into the space between the exterior of skirt 17 and the inside surface of tear tab 42a. As shown in enlarged view FIG. 14, cavity 76 is formed with subgates 77. As cavity 76 is removed (FIGS. 9 and 10), subgates 77 cut the material joining tab 42a and flange 19 to form aperture 28. Thereafter tab 42a may slide relative to cap 12.

Figure 14:
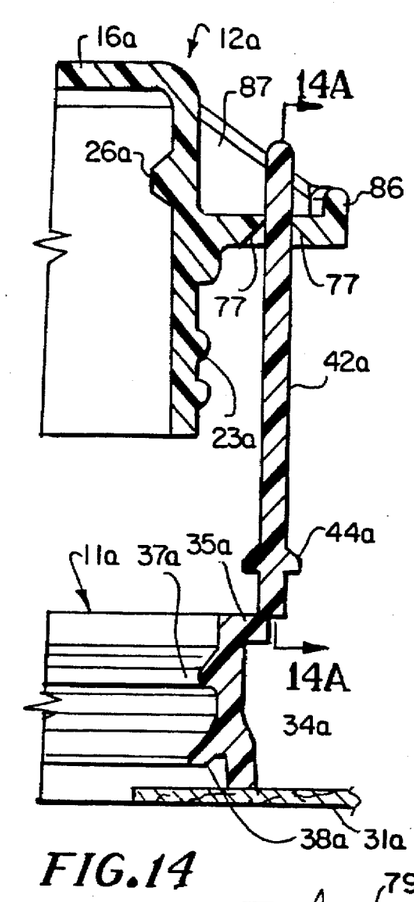
FIG. 14 is an enlarged sectional view of a potion of the product shown in FIG. 9.
Figure 14A:
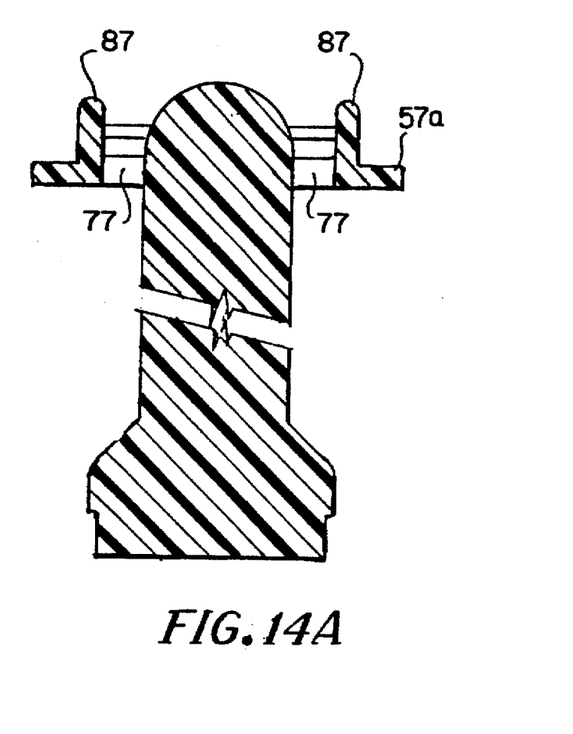
FIG. 14A is a sectional view taken along line 14A—14A of FIG. 14.

By way of further explanation of the formation of the product molded in FIG. 9, reference is made to FIGS. 14 and 14A. Steel portions of cavity 76 form the triangular voids below subgates 77. As the cavity moves from the position of FIG. 9 to the position of FIG. 10, the steel cuts between the subgates 76 and tab 42a, the subgates flexing to permit this cutting movement.

To reinforce the tab 57a, a rim 86 is formed upstanding at its outer edge and radial gussets 87 join skirt 17 and rim 86.

Figure 11:
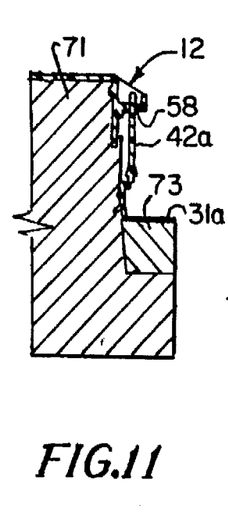

As shown in FIG. 11, the slides 74 retract. In this position the intermediate product of cap and fitment rest on the exterior of core 71 and above ejection ring 73.

Figure 12:
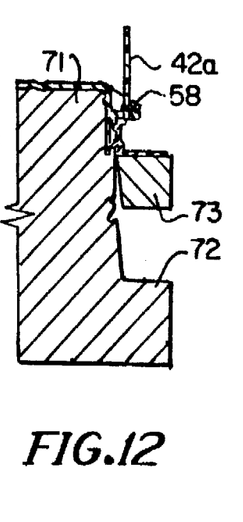

In FIG. 12, core 71 retracts further while ring 73 remains stationary. As this operation is performed, because of the groove 78 in core 71 (see FIG. 10) and the fact that the presence of such groove 78 has formed the internal bead 26, the cap is pulled downward toward the fitment. During this movement pull tab 42a moves upward through aperture 28 until the tangs 44a engage the upper surface of flange 35. Threads 23 and 37a slip past each other and then interengage. Shoulder 21 engages flange 35a, limiting further movement of cap 12 relative to fitment 11a. The fitment and cap are now assembled.

Figure 13:
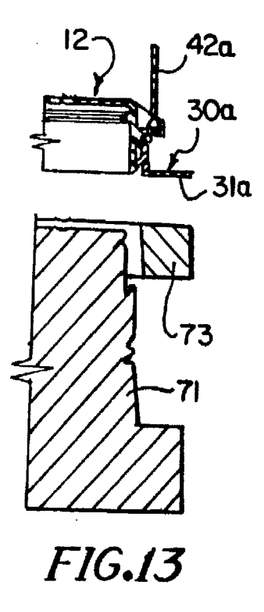

In FIG. 13, core 71 retracts further causing the ring 26a to disengage from the groove 78 thereby ejecting the end product in assembled condition.

Figure 15:
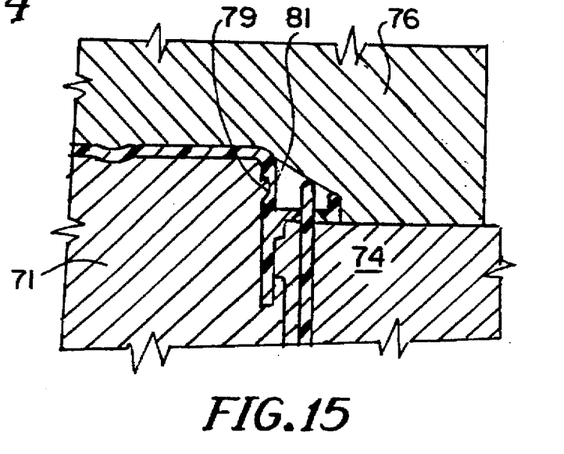
FIG. 15 is a fragmentary sectional view of a potion of the core of FIG. 9 and surrounding components of a modified construction.

In the modification shown in FIGS. 9–13, a groove 78 has been formed in core 71 to provide an internal bead 26a on skirt 17. In FIG. 15, a bead 79 is formed on the core 71a causing formation of a groove 81 in the interior wall of skirt 17A. The function of bead 79 and groove 81 is to provide an alternative means to pull the cap downward as the mold parts move from the position of FIG. 11 to the position of FIG. 12.

Figure 6:
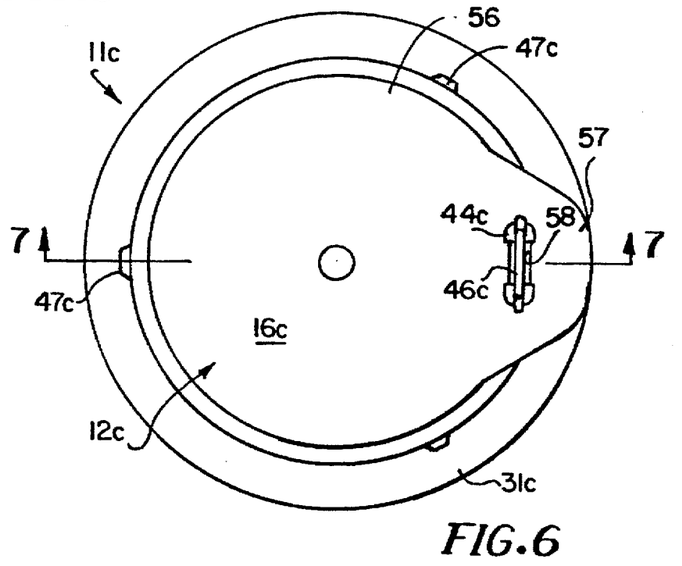
FIG. 6 is a top plan view of the structure of FIG. 5.
Figure 7:
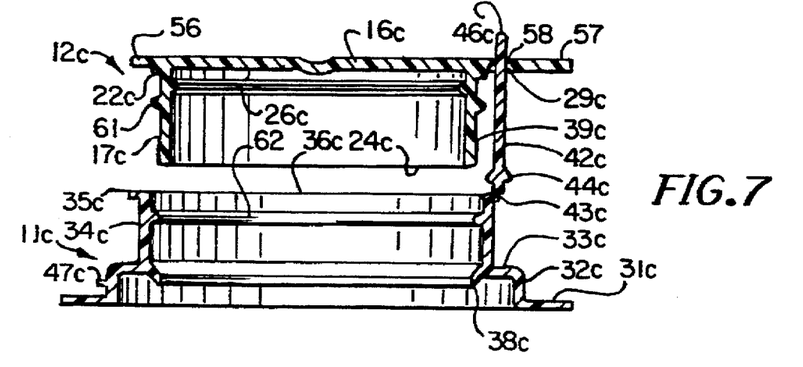
FIG. 7 is a vertical sectional view taken substantially along the line 7—7 of FIG. 6.
Figure 8:
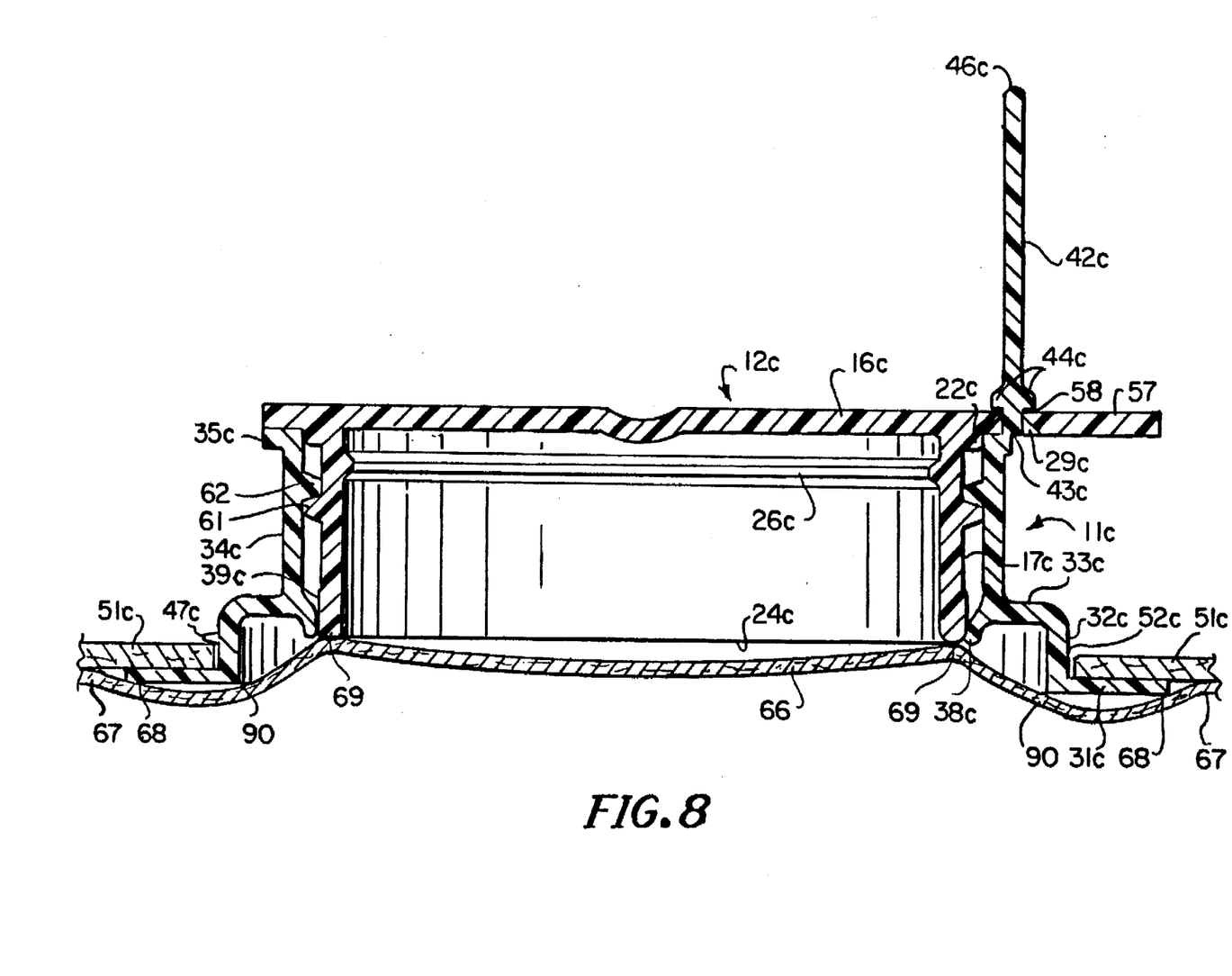
FIG. 8 is an enlarged vertical, sectional view of the assembled structure of FIG. 7 applied to a container panel and also showing an aseptic foil attached thereto.

Directing attention now to the modification of the invention shown in FIGS. 5–8, the threads 23 and 37 of the preceding modifications are eliminated. Skirt 17c of cap 12c has an external retention bead 61 formed thereon while the interior of spout 34c has an internal retention bead 62 formed therein. When the cap 12e is seated in the fitment 11c, as best shown in FIG. 8, the beads 61 and 62 fit tightly against each other.

Top 16c is formed with a peripheral flange 56 which seats upon a peripheral flange 35c on the top edge 36c of fitment 11c. At one location tab 57 projects outwardly and is formed with an aperture 58 shaped to receive tear tab 42c. When the cap is seated in the fitment as shown in FIG. 8, the tangs 44c rest on the upper surface of tab 57. The tab 57 has an additional use: It may be used to remove the cap 16c from the fitment spout 34c when it is necessary to dispense the contents of the container.

FIG. 8 shows a further modification of the invention. The container is further sealed with a barrier foil 66. Asceptic or hermetic packaging can be achieved in this way. In the embodiment of FIG. 8., the foil 66 is larger than the exterior of flange 31c. This foil 66 may be of a metal or plastic composition. Adjacent the outer edge of foil 66, it is attached, for example by means of weld 67 to the underside of the container wall 51c and is also welded to the underside of flange 31c and preferably to the bottom edge of skirt 17c. When the container is filled with sterile product, the foil 66 keeps the container sterile during transportation and storage. When the cap 12c is removed, the weld 69 is preferably sufficiently secure so that the foil which would otherwise block the aperture is removed along with the cap. Teeth or sharp serrations 90 may be incorporated to assist rupture of the foil so that the removal force is not excessive. In addition, attachment means other than welds (i.e. adhesives or mechanical attachment) can be employed to achieve the joining at 67 and 69.

Figure 5:
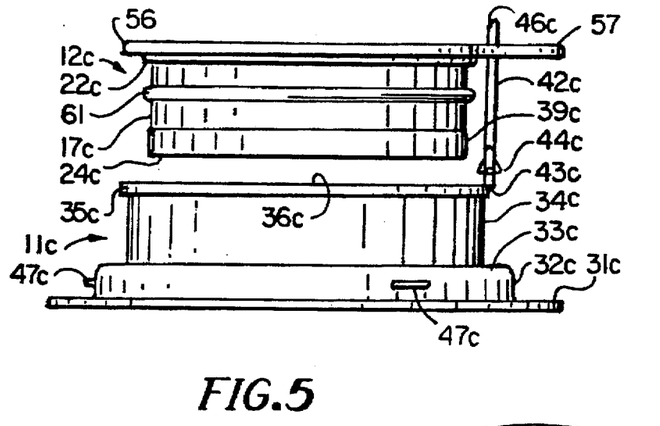
FIG. 5 is a view similar to FIG. 1 of a further modification.

It will be understood that FIG. 8 shows the aseptic foil 66 applied to the structure of FIGS. 5–7. However, it will be understood that the same principle may be used in connection with a modification of FIGS. 1–4.

Figure 16:
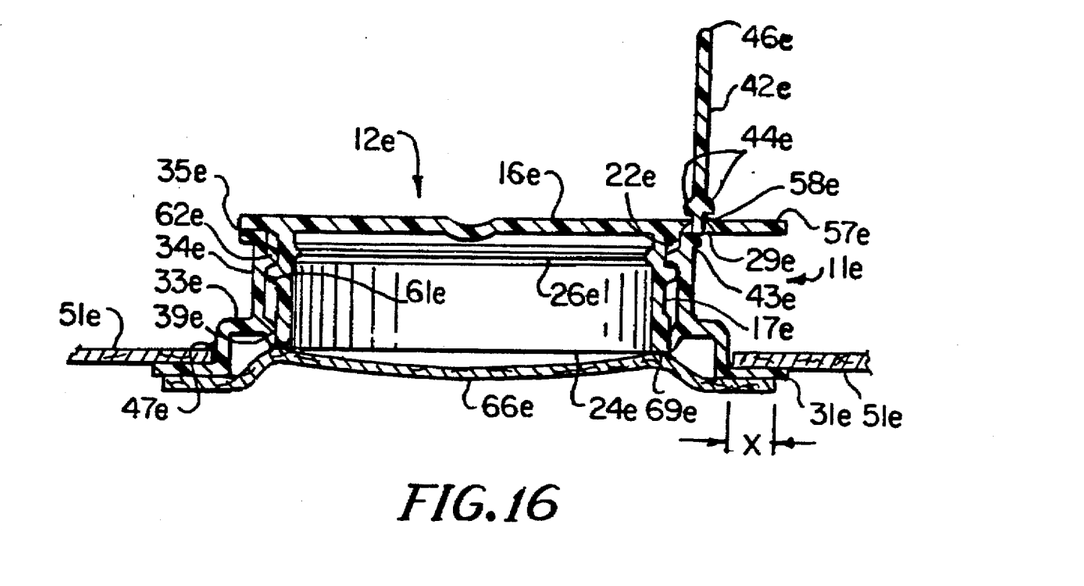
FIG. 16 is a view similar to FIG. 8 of a modified foil barrier.

It will be noted that in FIG. 8 foil 66 extends outwardly beyond the periphery of flange 31e so that it is welded to the underside of carton wall 51c. In the modification shown in FIG. 16, the outer edge of foil disk 66e is spaced somewhat inwardly from the periphery of flange 31e. However, there is an annular zone indicated by X in FIG. 16 where the foil 66 engages the underside of flange 31e. In such a structure the effective diffusion path length for gaseous substances such as oxygen, water vapor or odors is the distance X. This extended length, combined with the relative thinness of flange 31e (approximately 0.020") produces a relatively extended path for diffusion of gaseous contaminants. Thus, the embodiment of FIG. 16 is suitable for extended shelf life products despite the fact that the barrier film 66e does not extend outward to engage the underside of the carton 51e. In the form of the invention shown in FIG. 16, the foil 66 is optionally not only welded to the underside of flange 31e but also to the bottom edge 24e of cap skirt 17e.

Figure 17:
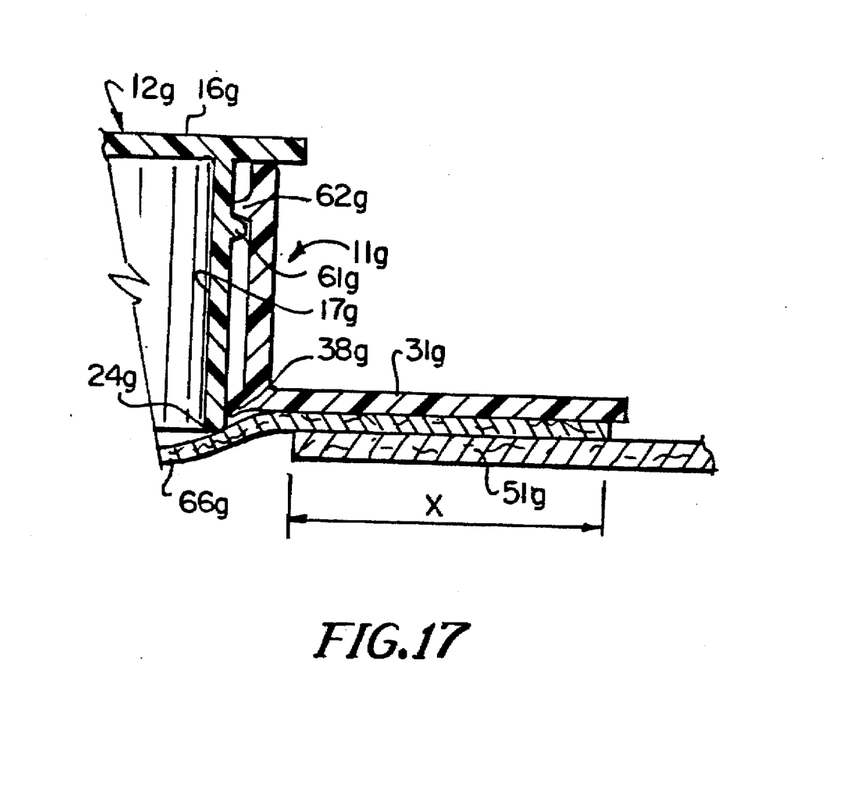
FIG. 17 is a fragmentary sectional view of a further modification of FIG. 8.

Directing attention to the structure shown in FIG. 17, the barrier foil 66g is attached to the bottom of the fitment attachment flange and does not extend beyond the periphery of flange 31g. The barrier film 66g is attached to the exterior of the carton 51g by a suitable adhesive (not shown) if required. Optionally the bottom edge 24g of skirt 17g is also welded to the barrier film 66g.

Figure 18:
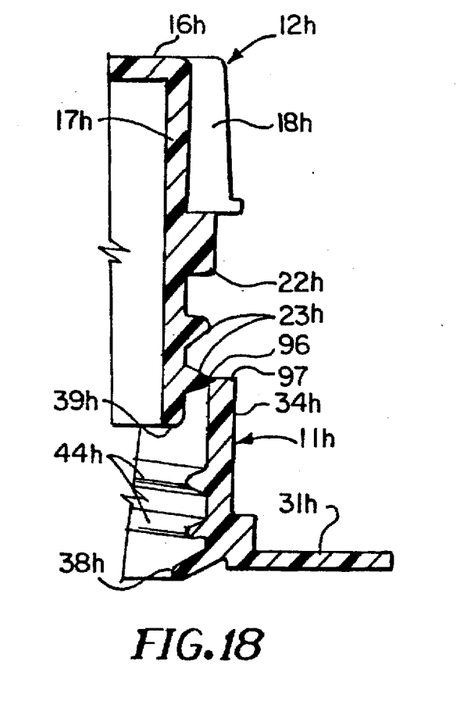
FIG. 18 is a fragmentary sectional view of another modified fitment and closure prior to assembly.

FIG. 18 illustrates an alternate construction. In this modification, a continuous frangible web connection 96 connects the plug 12h to the top edge 97 circumferentially around the parts. The parts may be installed on the container in the condition shown in FIG. 18. So long as the connector 96 is intact, the consumer is assured that there has been no tampering with the container. At the time of consumption, the user fractures the connection 96 either by twisting the closure 12h or other convenient means. The closure 12h may be installed on the fitment 11h after part of the contents of the container have been dispensed merely by screwing the closure 12h into the spout 34h.

Figure 19:
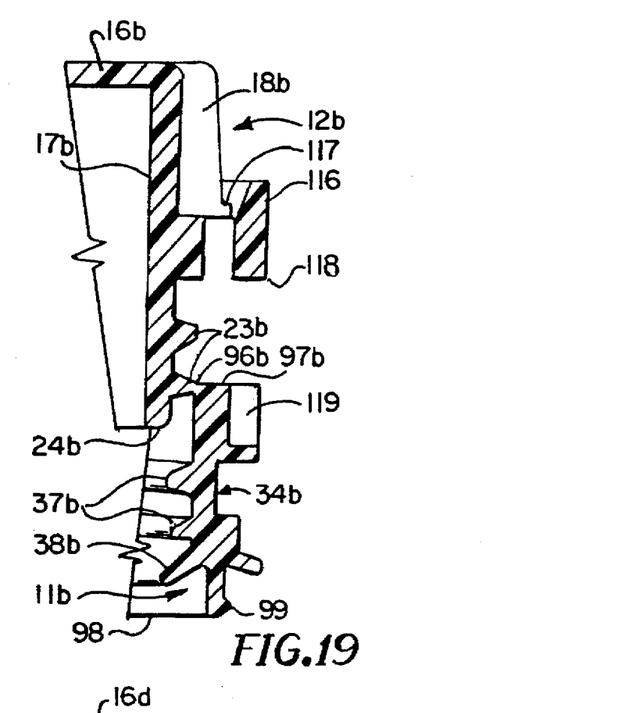
FIG. 19 is a view similar to FIG. 18 of still another modification.
Figure 20:
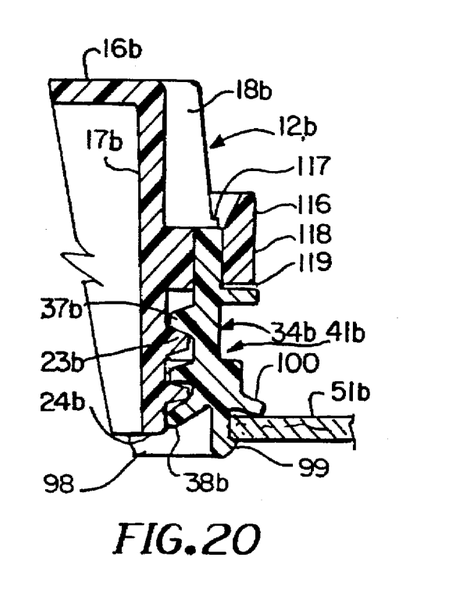
FIG. 20 is a fragmentary sectional view of the structure of FIG. 19 assembled and installed on a carton panel.

The form of the invention shown in FIG. 19, is particularly useful where the device is to be attached to a container having solid contents. FIG. 20 shows assembly of the closure 12b in the fitment spout 34b and attachment to the apertured panel 51b. The lower end of the fitment 11b has a downward extending ring 98 which fits inside the hole 22b and is retained therein by an outward extending barb 99 which engages under the panel 51b. To stabilize and also to seal the fitment, an outer seal member 100 engages the top surface of the panel 51b. In FIG. 19 the parts are shown prior to assembly of the plug to fitment spout. It will be understood that normally closure 12b is attached to the fitment lib before the ring 98 is inserted in the panel 51b. A tamper-evident feature is included in the structure of FIGS. 19 and 20. Surrounding skirt 17b is a narrow tamper-evident band 116 which is connected to the lower ends of ribs 18b by bridges 117. At diametrically spaced positions on the underside of band 116 are depending pawls 118 which engage sockets 119 in the upper exterior of spout 34b. By pulling a tab (not shown) outward, band 116 may be disconnected from closure 12b and the closure may be unscrewed from fitment 11b since pawls 118 are out of sockets 119. Tearing of band 116 gives evidence of tampering with the contents of the container.

Figure 21:
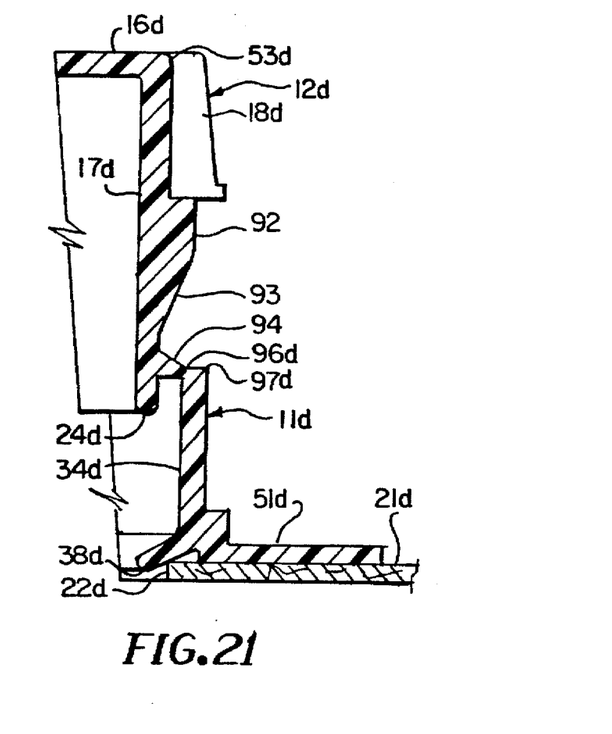
FIG. 21 is a view similar to FIG. 18 of another modification.

FIG. 21 shows a very simple, tamper-evident construction. No threads are required on the closure or spout. Rather, the exterior of skirt 17d, immediately below ribs 18d is formed with a cylindrical external sealing surface 92 and below surface 92 is an undercut 93 merging into outward curved portion 94. Portion 94 extends around the circumference of closure 12d and is joined to the inner corner of top edge 97d of fitment 11d by a frangible circumferential web 96d.

Web 96d makes the combination tamper-evident since the container cannot be opened without breaking the same. When the consumer wishes to open the container, closure 12d is disconnected from fitment 11d by breaking web 96d by any convenient means. For reclosure purposes, surface 24d contacts seal member 38d.

Figure 22:
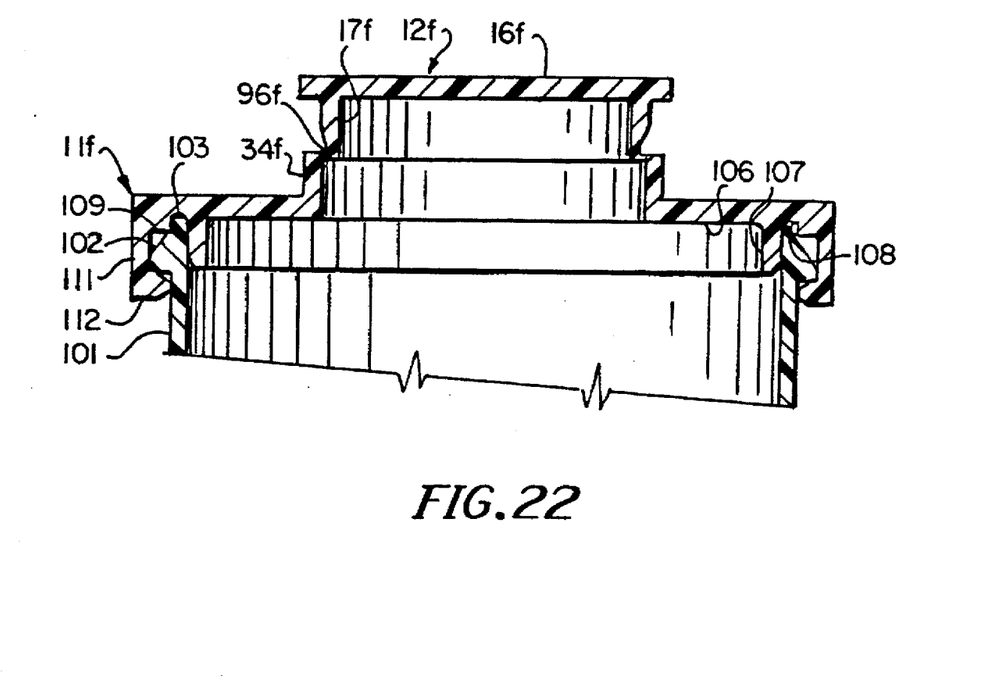
FIGS. 22 and 23 are vertical sectional views of a modification showing a different means for attachment to the container around a container orifice.
Figure 23:
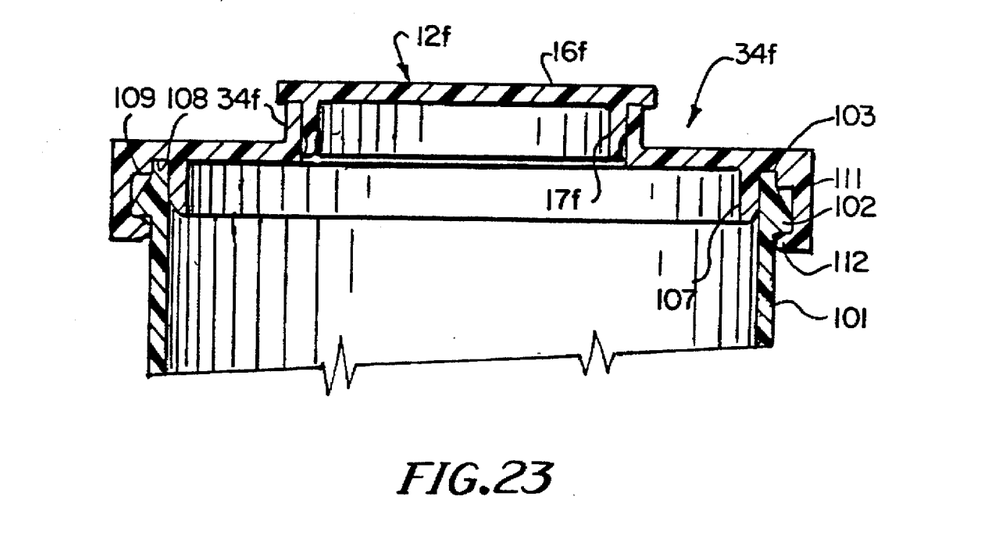

In the modification of FIGS. 22–23, fitment 11f is applied to a container 101 of any convenient type such as one having an external locking bead 102 below top edge 103. Fitment 11f has an annular top 106 having upward extending spout 34f. The underside of top 106 has an inner skirt or hollow plug 107 which fits inside the wall of container 101. Outward of plug 107 is a groove 108 which receives edge 103 and beyond groove 108 is a shoulder 109 which fits against the upper outer edge of container wall 101. A peripheral short skirt 111 has an internal bead 112 which locks under bead 102.

The closure 12f is quite similar to that of FIG. 21. The lower edge of skirt 17f is bevelled and is initially connected by frangible connector 96f to the inner edge of the upper end of spout 34f.

The closure as shown in FIG. 22 is tamper-evident. The consumer grasps closure 12f, breaking connector 96f. For reclosure purposes, closure skirt is inserted in spout 34f and pushed down to assume the closed position shown in FIG. 23.

In other respects the modifications of FIGS. 3A, 5–8, 16, 17, 18, 19–20, 21 and 22–23 resemble those of the preceding modifications and the same reference numerals followed by the subscripts a, c, e, g, h, b, d, and f respectively, are used to designate corresponding parts.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. In combination, a cap and a fitment, said cap comprising a top, a skirt depending from said top, means forming an aperture extending outward from said cap, and first engagement means on said skirt, said skirt having an interior and an exterior, said fitment remote from said cap, and comprising fastening means for fastening said fitment to a container surrounding a hole formed in said container, a spout extending upward from said fastening means shaped to receive a portion of said skirt and having second engagement means cooperable with said first engagement means to detachably secure said cap and fitment together, an elongated tab attached to said fitment extending up to at least a bottom edge of said means forming an aperture and located directly beneath and initially attached to said means forming an aperture with a frangible connection, said tab comprising a runner for flow of molten plastic from said cap to said fitment during molding of said combination.

2. The combination of claim 1 wherein said tab extends upward from said fitment through said aperture.

3. The combination of claim 1 in which said cap and said fitment have mutually engageable frangible first and second tamper-evident means respectively, said first and second tamper-evident means engaging when said cap skirt is seated in said fitment spout, at least one of said first and second tamper-evident means being frangible whereby said cap cannot be removed from said spout without fracturing said frangible tamper-evident means.

4. The combination of claim 3 in which said first tamper-evident means is said aperture and said second tamper-evident means comprises said tab.

5. The combination of claim 4 in which said tab is slidable within said aperture, said tab fitting closely within said aperture, said second tamper-evident means further comprising tangs on said tab positioned to slip through said aperture and engage said means forming an aperture on a side remote from said fitment to restrain separation of said closure from said fitment so long as said frangible means is intact.

6. The combination of claim 5 wherein said frangible means comprises an area of weakness formed in said tab adjacent said fitment, whereby when said tab is pulled said tab breaks away from said fitment at said area of weakness.

7. The combination of claim 1 wherein said means forming an aperture comprises an space extending outwardly of said cap.

8. The combination of claim 1 which further comprises an internal circumferential bead on said skirt.

9. The combination of claim 8 which further comprises first and second shoulders on said skirt and said fitment, said shoulders engaging when said skirt is moved into said spout to restrain further movement into said spout.

10. The combination of claim 1 in which said first and second engagement means comprise mating threads.

11. The combination of claim 10 in which first engagement means are external threads and said second engagement means are internal threads.

12. The combination of claim 1 having first and second seal means, said first seal means comprising a smooth cylindrical surface adjacent a lower end of said skirt and said second seal means comprising a downward-inward extending ring on a lower end of said spout to seal against said cylindrical surface.

13. The combination of claim 1 in which said fastening means comprises an outer annular portion shaped to fit against an underside of said container, an offset portion on an inner edge of said outer annular portion adapted to fit through said hole and an annular rim joining an upper edge of said offset portion to said spout.

14. The combination of claim 13 which further comprises a container formed with a hole, means securing said outer annular portion to the inside of said container around said hole, said offset portion extending through said hole to the outside of said container.

15. The combination of claim 14 which further comprises a plurality of projections on said offset portion extending outwardly to engage the outside of said container.

16. The combination of claim 1 in which said first engagement means comprises a first bead on said exterior of said skirt and said second engagement means comprises a second bead on an interior of said spout positioned to fit tightly over said first seal bead in the assembled position of said cap and said fitment to seal said container from atmosphere.

17. The combination of claim 1 which further comprises a sealing foil attached to said fitment positioned to cover said spout.

18. The combination of claim 17 wherein said foil is attached to the bottom edge of said skirt.

19. The combination of claim 17 wherein said foil is attached to said fastening means.

20. The combination of claim 19 which further comprises means to assist in rupture of said foil when said cap is initially removed from said spout.

21. The combination of claim 20 wherein said assist means comprise serrations located above said foil.

22. The combination of claim 19 wherein said foil is larger than said fastening means, said foil projecting beyond said fastening means whereby said foil may be attached directly to said container.

23. The combination of claim 1 wherein said first and second engagement means produce a interference snap engagement or disengagement.

24. In combination, a cap and a fitment, said cap comprising a top, a skirt depending from said top, first engagement means on said skirt, said skirt having an interior and an exterior, said fitment comprising fastening means for fastening said fitment to a container surrounding a hole formed in said container, a spout extending upward from said fastening means shaped to receive a portion of said skirt and having second engagement means cooperable with said first engagement means to detachably secure said cap and fitment together, said cap and said fitment having mutually engageable first and second tamper-evident means respectively, said first and second tamper-evident means engaging when said cap skirt is seated in said fitment spout, at least one of said first and second tamper-evident means being frangible whereby said cap cannot be removed from said spout without fracturing said frangible tamper-evident means, and and first and second seal means, said first seal means comprising a smooth cylindrical surface on said skirt and said second seal means comprising a downward-inward extending ring on said spout to seal against said cylindrical surface.

25. The combination of claim 24 which further comprises means forming an aperture extending outwardly of said cap and in which said first tamper-evident means comprises said aperture and said second tamper-evident means comprises a tab attached to said fitment and extending through said aperture.

26. The combination of claim 25 in which said tab is slidable within said aperture, said tab fitting closely within said aperture, said second tamper-evident means further comprising tangs on said tab positioned to slip through said aperture and engage said means forming an aperture on a side remote from said fitment to restrain separation of said closure from said fitment so long as said frangible means is intact.

27. The combination of claim 26 wherein said frangible means comprises an area of weakness formed in said tab adjacent said fitment, whereby when said tab is pulled said tab breaks away from said fitment at said area of weakness.

28. The combination of claim 24 which further comprises first and second shoulders on said skirt and said fitment, said shoulders engaging when said skirt is moved into said spout to restrain further movement into said spout.

29. The combination of claim 24 in which said first and second engagement means comprise mating threads.

30. The combination of claim 29 in which first engagement means are external threads and said second engagement means are internal threads.

31. The combination of claim 24 in which said first engagement means comprises a first bead on said exterior of said skirt and said second engagement means comprises a second bead on an interior of said spout positioned to fit tightly over said first seal bead in the assembled position of said cap and said fitment to seal said container from atmosphere.

32. The combination of claim 24 which further comprises a sealing foil attached to said fitment positioned to cover said spout.

33. The combination of claim 32 wherein said foil is attached to the bottom edge of said skirt.

* * * * *